Jan. 15, 1963   J. R. GILCHRIST   3,073,716
METHOD OF MAKING A CLEANING PAD
Filed Nov. 8, 1957
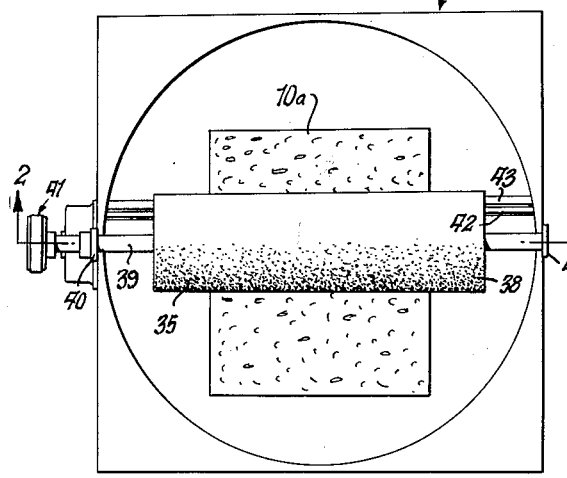
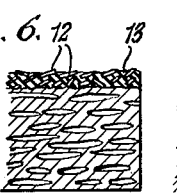
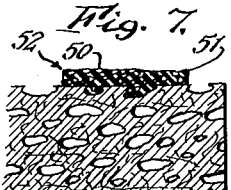
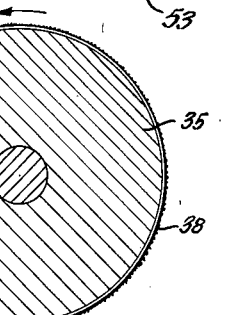
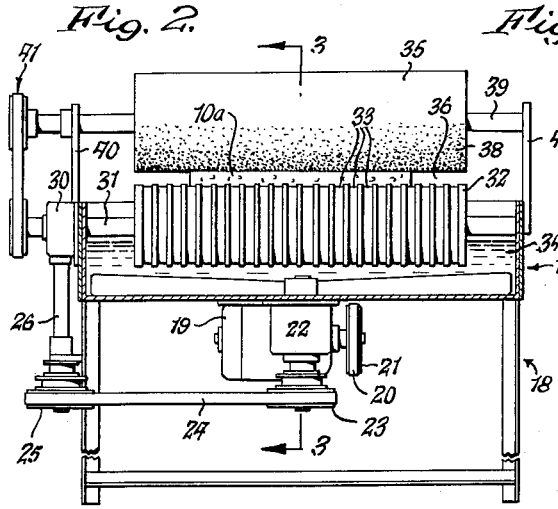
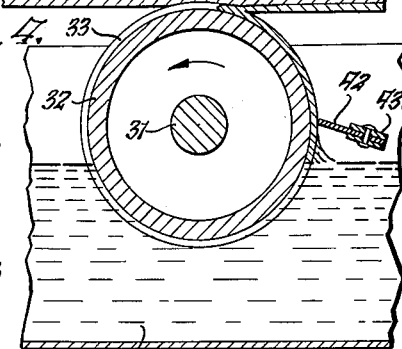
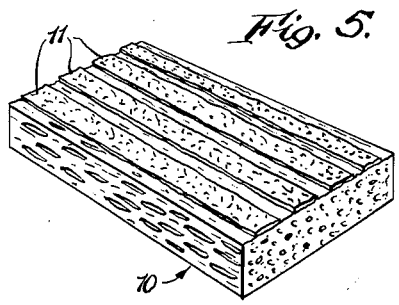
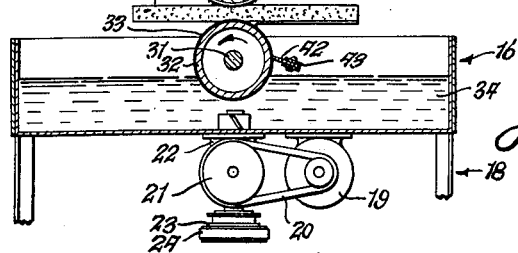
INVENTOR.
James R. Gilchrist
BY
Popp and Sommer
ATTORNEYS.

3,073,716
METHOD OF MAKING A CLEANING PAD
James R. Gilchrist, Hamburg, N.Y., assignor to Truly-Magic Products, Inc., Buffalo, N.Y., a corporation of New York
Filed Nov. 8, 1957, Ser. No. 695,316
2 Claims. (Cl. 117—43)

This invention relates to a cleaning pad and method of making the same and is illustrated in one form as embodied in a bug remover in the form of a permanently soft hand sponge provided with a working face especially adapted to remove the encrusted bodies and juices of bugs from windshields, headlights and the like to restore their normal visibility and light transmitting functions. However, features of the invention can also be used in conjunction with a scouring pad having abrasive particles cemented directly to a cellulose sponge body and which is also illustrated.

An important object of the present invention is to provide a method of applying granulated solids in an adhesive in the form of thick layers or stripes to a sponge body both to obtain an adequate quantity of the solids on the surface of the sponge and also to permit of applying such solids directly to very coarse sponges, such as large pored cellulose sponges where adequate solids and adhesive are applied to fill and key into the large surface pores or craters.

Another object is accordingly to provide a scouring pad composed of a cellulose sponge body having abrasive grits directly and tenaciously adhered to its scouring surface.

Another object of the invention is to provide a bug remover which will quickly absorb a proper quantity of liquid, preferably a solvent of dried bug juices, for cleaning the windshield and headlights of an automobile and which is provided with a surface which, in combination with the liquid, rapidly clears away the bodies and encrusted juices of bugs and leaves the surface of the glass in a clear unsoiled condition.

Another object is to provide such a bug remover the working face of which, while highly effective in the removal and clearing away of encrusted bug juices and bodies, will not scratch or otherwise deleteriously affect the surface of the glass.

Another object is to provide such a bug remover which will pick up the bug bodies and remove them from the windshield and will readily release the bug solids on dipping and rinsing or squeezing the bug remover in a pail of water.

Another object is to provide such a bug remover which is low in cost and attractive in appearance and at the same time will stand up under conditions of severe and constant use without loss of efficiency.

Another object is to provide a method of making such a bug remover which rapidly provides ridges of adequate and uniform height and material upon the surface of a permanently soft sponge to render the ridges fully effective in the rapid removal of encrusted bugs from a glass surface.

Other objects and advantages of the invention will be apparent from the following description and drawings in which:

FIG. 1 is a top plan of a machine used in the production of bug removers embodying the present invention.

FIG. 2 is a veritcal section taken generally on line 2—2, FIG. 1.

FIG. 3 is a vertical section taken generally on line 3—3, FIG. 2.

FIG. 4 is an enlarged fragmentary vertical section similar to FIG. 3 and showing in greater detail the manner in which thick ridges of non-abrasive material which physically removes solids from the glass being cleaned are applied.

FIG. 5 is a perspective view of a bug remover embodying the present invention.

FIG. 6 is an enlarged fragmentary vertical section through a part of the bug remover shown in FIG. 5.

FIG. 7 is a view similar to FIG. 6 but illustrating a modification of the invention in the form of a cellulose sponge having thick ridges containing abrasive particles applied as stripes directly to its scouring face.

The body of the bug remover embodying the present invention is illustrated in FIGS. 1–6 as being in the form of a rectangular body 10 of polyurethane foam. To physically remove the solids of bugs and bug juices from windshileds broad, thick spaced stripes 11 are applied to the working face of the foam plastic sponge 10, these stripes consisting of granulated wood, preferably hard wood, which does not soften in water and which will not scratch glass, the pieces of which are indicated at 12, and an adhesive indicated at 13. It will be noted that the stripes 11 occupy a part only of the working face of the body 10, the remaining part being exposed to supply liquid to the surface being cleaned. While the body 10 is preferably of polyurethane foam, any premanently soft or pliable foam sponge made from synthetic plastic or natural rubber can be used. The pieces 12 are of granulated wood, preferably of hardwood which is highly effective in physically removing solids from the glass, does not soften in water even with continuous use, and at the same time will not scratch glass even when used without water or diluted solvent. The adhesive 13 must be insoluble in water and in the dilute solvent for bug juices must be permanently resilient so as to flex in moving over bug encrustations as well as to follow the curvature of windshields and headlights; must be tenaciously adherent to the granulated wood particles 12 as well as to the body 10 of polyurethane foam or other permanently yielding sponge body. The adhesive is preferably a thermosetting synthetic resin which is capable of setting at room temperature and which contains an adhesive plasticizer which is soluble in a solvent capable of evparorating without hazard or unpleasant odor in the open air. Preferably a solvent such as methyl ethyl keytone is employed, the thermosetting synthetic resin preferably being a nitrol rubber modified with a vinyl copolymer resin in admixture a thermosetting phenolic type resin.

To make the bug remover as above described and as shown in FIGS. 5 and 6, a large square 10a of polyurethane sponge is treated in the apparatus shown in FIGS. 1–4 and then cut up to provide pieces of the size illustrated in FIG. 5. This apparatus includes a vat or open rectangular tank 16 which can be mounted on a stand 18. An electric motor 19 on the underside of the tank 16, through a belt drive 20, drives a pulley 21 on a speed reducer 22. The output pulley 23 of the speed reducer 22 is connected by a belt 24 to a pulley 25 at the lower end of a vertical shaft 26 at the side of the tank 16 and stand 18. Through a gear reducer 30 this vertical shaft 26 drives a horizontal shaft 31 journaled in and extending through opposite side walls of the tank 16. This shaft 31 carries a grooved roll 32, the lower part of which dips into a slurry or body 34 composed of the granulated hardwood 12 and the resinous binder 13 in solution with methyl ethyl keytone as the solvent. The grooves 33 are separate annular grooves extending circumferentially around the roll in uniformly spaced relation and the width of these grooves 33 is equal to the width of the stripes 11 on the finished product and which are produced by these grooves.

A backup roll 35 is arranged above and parallel with the grooved roll 32, the space 36 between the rolls being slightly less than thickness of the rectangular sponge workpiece 10a. It is provided with a roughened periphery as by the provision of a peripheral sheet 38 of sandpaper. The shaft 39 of the backup roll 35 is journalled in standards 40 extending upwardly from the sides of the tank 16 and a pulley and belt drive 41 connects corresponding ends of the shafts 31, 39.

An important feature is that the grooved roll 32 and the backup roll 35 are driven in the same angular direction, this being illustrated as being counterclockwise as viewed in FIG. 3. On the rising side of the grooved roll 32, a wiper blade 42 is supported in engagement with its periphery so as to strip off excess slurry from the grooved roll 32 and leave the grooves 33 therein completely filled with slurry. This wiper blade is shown as made of rubber and as supported by a holder 43 the ends of which can be mounted on the side walls of the tank 16.

In making bug removers with the apparatus as above described, the lower part of the grooved roll 32 dips into the body 34 of slurry of the dissolved resin and granulated hardwood, serving to keep the granulated hardwood in uniform dispersion throughout the slurry. As the grooved roll 32 rotates, the grooves 33 on its underside are filled with the slurry and carried up to the wiper blade 42 which strips any excess from the periphery of the roll and returns it to the body 34. The rising side of the grooved roll 32 with its grooves 33 filled with the slurry comes into pressure contact with the underside of a rectangular piece 10a of polyurethane sponge which had been fed between the rolls 32 and 35 from the left hand side thereof as viewed in FIGS. 3 and 4. Due to the roughened surface 38 of the drive roll 33, the piece 10a of polyurethane sponge travels to the right as viewed in FIGS. 3 and 4 and in the direction opposite to the crest of the peripheral surface of the grooved roll 32. As a consequence the slurry in the grooves 33 is abstracted by the piece 10a of polyurethane sponge by a wiping action of the sponge being propelled counter to the direction of movement of the peripheral surface of the grooved roll 32 which it contacts. Through this wiping action the slurry is piled up on the piece 10a as thick stripes 11 of resin and granulated hardwood. The degree of buildup of the slurry to so form the stripes 11 on the finished product can be adjusted by regulation of the depth of the grooves 33 as well as by the relative speeds of rotation of the drive roll 35 and grooved roll 32. After the stripes 11 of slurry have so been applied in the form of ridges on the piece 10a of polyurethane the solvent for the plasticizer is permitted to evaporate and the thermosetting resin binder permitted to set and provide a flexible and tenacious bond between the granulated hardwood and the polyurethane sponge. The piece 10a is then cut up into the pieces 10, the latter being of a size to be conveniently gripped by one's hand.

In use, the bug remover is used in conjunction with a liquid, preferably an aqueous solvent for bug juices, the bug remover being alternately dipped therein and applied to the glass surface being cleaned. An adequate quantity of the liquid is picked up on each immersion of the bug remover while at the same time loose bug parts are washed from the surface of the bug remover. Upon then wiping the surface to be cleaned, the liquid contained in its polyurethane sponge is applied to the surface to be cleaned while at the same time the surface is gently wiped by the exposed sponge surfaces between the stripes 11. The granulated hardwood acts on the bug encrustations, mechanically shearing them from the surface but without scratching the polished surface being cleaned. The solids so mechanically removed by the hardwood granules are caught by the exposed sponge surfaces between the stripes 11 and are removed from the surface being cleaned along with the bug remover and are deposited in the part of liquid cleaning solution when the bug remover is rinsed. Since the granules 11 are of hardwood the granules do not soften even under continued use.

The depth of fill combined with the uniform surface level provided by wiping the material from the supply of slurry 34 by the grooved rotor 32 traveling as described also adapts the present process to apply fine abrasive grits 50 contained in an adhesive 51 as thick raised stripes 52 to one face of a coarse cellulose sponge 53. Such sponges are common kitchen cleaners and consist of regenerated cellulose containing reinforcing fibers and blown into a sponge having both large and small voids forming large and small surface craters. Such sponges are stiff and hard when dry and cannot be provided with a surface of abrasive particles by conventional methods because the abrasive and adhesive cannot be made to bridge the large craters. By the above described wiping action of the roll 32 the deeper craters of the cellulose sponge 53 can be completely filled with the slurry of abrasive grains 50 and adhesive 51 to provide spaced stripes having coplanar exposed surfaces, the spaces between the stripes providing water for scouring and flushing.

From the foregoing it will be seen that the present invention provides a bug remover having the many advantages set forth.

We claim:

1. The method of making a cleaning pad having a sponge body with its working face having craters and provided with thick separated stripes of granulated solids adhesively keyed into the craters of said working face, which comprises (a) passing the underside of a continuously moving surface through a body of slurry of said granulated solids and adhesive to adhere said slurry thereto, (b) thereafter passing said moving surface upwardly from said body to remove a continuous layer of said slurry from said body adhered to said underside of said surface, (c) removing portions of said layer of slurry from said surface at spaced intervals transversely of the line of movement of said surface to leave a series of individual transversely spaced stripes of said slurry on said surface which extend in the direction of movement of said surface, (d) inverting said underside of said moving surface to move said stripes longitudinally along the top side thereof, (e) pressing a sponge body downwardly against said moving top side of said surface to remove said stripes of slurry therefrom, and (f) moving said sponge body in the direction opposite to the movement of said top side of said moving surface to bring progressively different parts of said sponge body into contact with said stripes of slurry and to pile up said stripes of slurry from said top side of said moving surface onto the underside of said sponge body to fill said craters and produce raised stripes of said granulated solids and adhesive on said working face of said sponge body.

2. The method as set forth in claim 1 wherein said particles are granulated hard wood.

References Cited in the file of this patent

UNITED STATES PATENTS

| | | |
|---|---|---|
| 1,300,394 | Hoffman | Apr. 5, 1919 |
| 1,611,243 | Sawyer et al. | Dec. 21, 1926 |
| 1,974,209 | Fowler | Sept. 18, 1934 |
| 2,124,061 | Gould | July 19, 1938 |
| 2,333,629 | Beadle | Nov. 9, 1943 |

(Other references on following page)

UNITED STATES PATENTS

| | | | |
|---|---|---|---|
| 2,426,441 | Dronsfield | Aug. 26, | 1947 |
| 2,616,110 | Kearns | Nov. 4, | 1952 |
| 2,665,528 | Sternfield et al. | Jan. 12, | 1954 |
| 2,683,098 | Sinks | July 6, | 1954 |
| 2,780,533 | Hurst | Feb. 5, | 1957 |
| 2,804,728 | Politzer et al. | Sept. 3, | 1957 |
| 2,842,092 | Pomper | July 8, | 1958 |

FOREIGN PATENTS

| | | | |
|---|---|---|---|
| 722,513 | France | Mar. 17, | 1932 |
| 166,777 | Australia | July 1, | 1954 |
| 313,624 | Switzerland | Apr. 30, | 1956 |

OTHER REFERENCES

Serial No. 353,978, Ruhnau (A.P.C.), published May 11, 1943.